(12) United States Patent
Korcz et al.

(10) Patent No.: US 8,889,984 B2
(45) Date of Patent: Nov. 18, 2014

(54) MOUNTING BRACE ASSEMBLY FOR MOUNTING AN ELECTRICAL BOX

(71) Applicant: Hubbell Incorporated, Shelton, CT (US)

(72) Inventors: Krzysztof W. Korcz, Grainger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 20 days.

(21) Appl. No.: 13/781,021

(22) Filed: Feb. 28, 2013

(65) Prior Publication Data

US 2014/0238717 A1    Aug. 28, 2014

(51) Int. Cl.
  *H02G 7/05*  (2006.01)
  *H02G 3/12*  (2006.01)

(52) U.S. Cl.
  CPC .................................. *H02G 3/125* (2013.01)
  USPC ............... 174/40 R; 174/58; 174/63; 174/54; 248/343; 362/147

(58) Field of Classification Search
  USPC ........ 174/61, 63, 54, 40 R, 58; 248/343, 906, 248/342, 62; 362/147
  See application file for complete search history.

(56) References Cited

U.S. PATENT DOCUMENTS

| | | | |
|---|---|---|---|
| 2,930,564 A * | 3/1960 | Maier ......................... | 248/200.1 |
| 3,104,087 A | 9/1963 | Budnick et al. | |
| 3,214,126 A | 10/1965 | Roos | |
| 3,346,909 A | 10/1967 | Blackburn | |
| 4,041,657 A | 8/1977 | Schuplin | |
| 4,511,113 A | 4/1985 | Druffel et al. | |
| 4,803,603 A | 2/1989 | Carson | |
| 4,972,339 A | 11/1990 | Gabrius | |
| 5,045,985 A | 9/1991 | Russo et al. | |
| 5,057,979 A | 10/1991 | Carson et al. | |
| 5,222,800 A | 6/1993 | Chan et al. | |
| 5,374,812 A | 12/1994 | Chan et al. | |
| 5,386,959 A | 2/1995 | Laughlin et al. | |
| 5,505,419 A | 4/1996 | Gabrius | |
| 5,588,737 A | 12/1996 | Kusmer | |
| 5,690,423 A | 11/1997 | Hentz et al. | |
| 5,934,631 A | 8/1999 | Becker et al. | |
| 5,938,157 A | 8/1999 | Reiker | |
| 5,957,573 A | 9/1999 | Wedekind et al. | |
| 5,957,574 A | 9/1999 | Hentz et al. | |
| 6,004,011 A | 12/1999 | Sieczkowski | |
| 6,076,788 A | 6/2000 | Akiyama | |
| 6,082,878 A | 7/2000 | Doubek et al. | |
| 7,191,994 B2 | 3/2007 | Johnson et al. | |
| 7,355,118 B1 | 4/2008 | Gretz | |
| 7,857,275 B2 | 12/2010 | de la Borbolla | |
| 7,874,539 B2 | 1/2011 | Wright et al. | |
| 8,076,573 B1 * | 12/2011 | Gretz .......................... | 174/40 R |
| 8,158,882 B1 * | 4/2012 | Gretz .......................... | 174/40 R |

* cited by examiner

*Primary Examiner* — Dhirubhai R Patel
(74) *Attorney, Agent, or Firm* — Garrett V. Davis; Mark S. Bicks; Alfred N. Goodman

(57) ABSTRACT

A brace assembly is provided having a brace for mounting to a support and a hanger member. The hanger member is coupled to the brace by a bar positioned in a longitudinal slot in the bottom side of the brace. The bar enables the hanger member to slide along the length of the brace. The hanger member has a bottom wall and side walls with a top end for coupling to a support. A mounting bracket is removably coupled to the hanger member for supporting the brace.

27 Claims, 7 Drawing Sheets

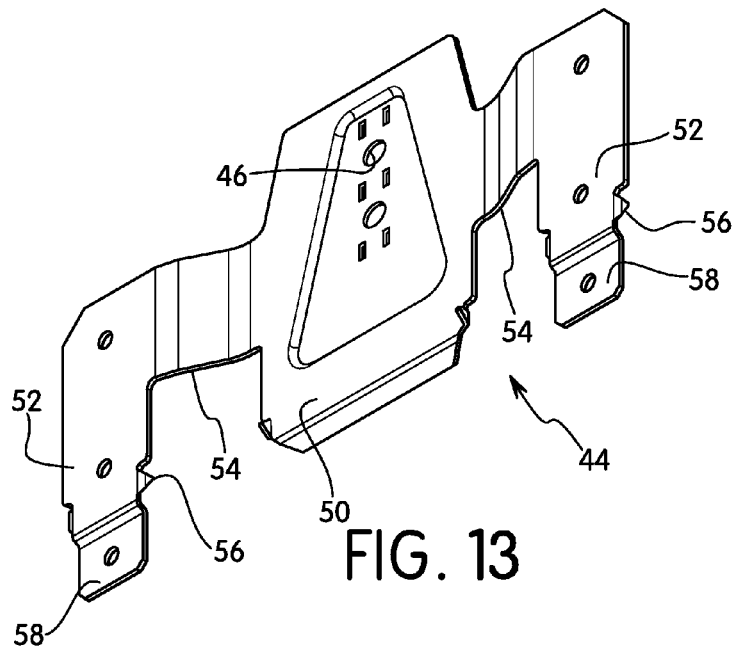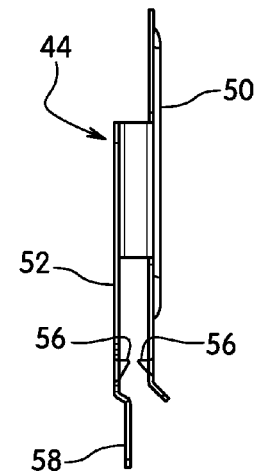
FIG. 13   FIG. 14
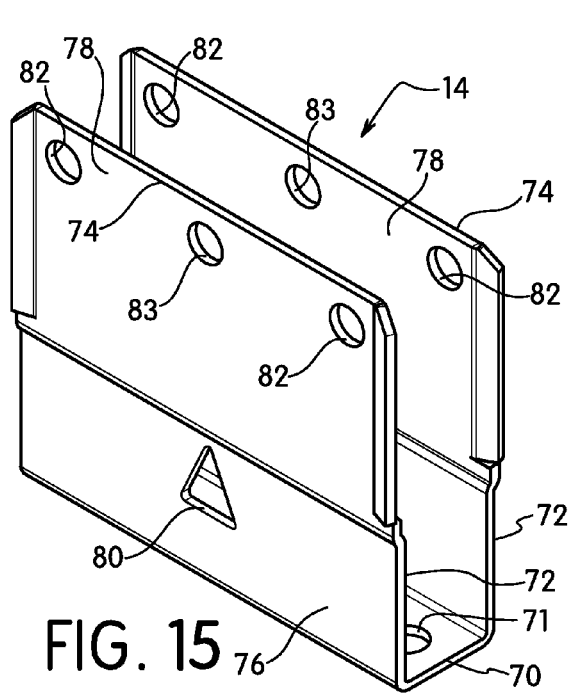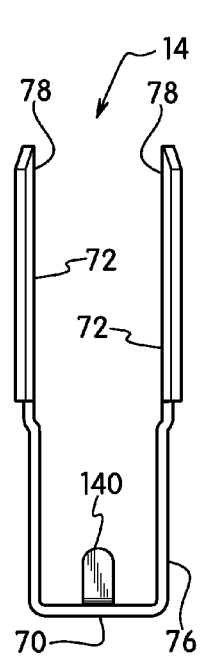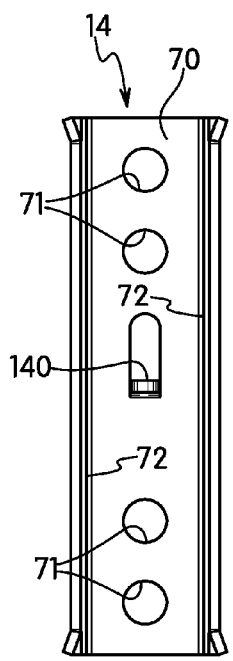
FIG. 15   FIG. 16   FIG. 17

MOUNTING BRACE ASSEMBLY FOR MOUNTING AN ELECTRICAL BOX

FIELD OF THE INVENTION

The present invention is directed to a mounting brace assembly for an electrical box. The invention is particularly directed to a brace assembly for attaching to a first ceiling support and having a mounting bracket for suspending the brace from a second support.

BACKGROUND OF THE INVENTION

Ceiling fan and support braces for ceiling fans and luminaires are known for the support various outlet boxes. The braces are typically installed between supports such as trusses and joists in the ceiling or other overhead structures. Braces are also known for connecting to the bar supports used in suspended ceilings. Such braces can be awkward to install and may not provide the needed support for the intended device to be mounted to the electrical box.

Examples of electrical boxes and braces for mounting electrical boxes include U.S. Pat. No. 5,938,157 to Reiker which discloses a fan brace slide support for attaching two opposing faces of adjacent ceiling joists. The brace has an open channel on the bottom face for receiving a mounting member with downwardly extending screws. The screws extend through openings in the bottom wall of the electrical box for supporting the weight of the ceiling fan so that the weight of the ceiling fan is applied to the brace and not to the electrical box. The electrical box is attached to the brace by a threaded nut.

U.S. Pat. No. 7,191,994 to Johnson et al. discloses a brace assembly for ceiling fans having an open U-shaped channel on the bottom side of the brace. A mounting bracket is received within the channel for supporting the electrical box.

U.S. Pat. No. 7,355,118 to Gretz discloses an electrical box mounting assembly. The assembly includes a brace extending between adjacent ceiling joists where the brace has a downwardly open channel. An inner clamping member is received within the brace having threaded holes for receiving a coupling screw. An outer clamping member is coupled to the bottom of the brace by the screw. The electrical box is attached to the outer clamping member by a plurality of screws threaded into the outer bracket.

U.S. Pat. No. 5,934,631 to Becker et al. discloses a hanger bar assembly having an open channel on a bottom face. The assembly includes two telescopically connected brace members that can be adjusted to fit between the adjacent ceiling joists. A fastener plate slides into the channel. The electrical outlet box is secured to the plate by screws extending through the bottom wall of the electrical box.

U.S. Pat. No. 7,857,275 to de la Borbolla an adjustable electrical box hanger bar assembly having two telescopically connected brace members. A U-shaped bracket fits over the top edge of the brace and is attached to the electrical box by coupling screws.

U.S. Pat. No. 3,346,909 to Blackburn discloses a support for draperies and the like having a generally U-shape with an open channel on the bottom face with a sliding member received within the channel.

While these devices are generally suitable for the intended uses, there is a continuing need in the industry for improved mounting assemblies for mounting an electrical box.

SUMMARY OF THE INVENTION

The present invention is directed a brace assembly for supporting an electrical box and an electrical device. In particular the invention is directed to a brace assembly having a structure for mounting to a ceiling bar mounting assembly commonly used in suspended ceilings. The brace assembly is configured for supporting electrical devices such as, for example, a ceiling fan, luminaire or other lighting fixture.

Accordingly, a primary aspect of the invention is to provide a brace assembly having a structure that is suitable for supporting the weight of an electrical fixture such as a ceiling fan or lighting fixture where the brace assembly is positioned above the ceiling panels or ceiling tiles. The brace is coupled to the ceiling support so that the weight of the electrical device is supported by the brace rather than the ceiling panels.

Another feature of the invention is to provide a brace assembly having a hanger member that is removably coupled to a brace and that can be moved along the length of the brace to selectively position the hanger member and electrical box with respect to the brace assembly and the support.

A further feature of the invention is to provide a brace assembly that can be mounted to a T-bar shaped ceiling support or ceiling grid used for a suspended ceiling where the brace assembly includes a hanger member that can be coupled to a secondary support for increasing the load capabilities of the assembly. The brace can have indicia to identify a load rating of the brace and the electrical box. The hanger member and/or the rear wall of the electrical box can have a window or other opening that aligns with the indicia so that the load rating is visible after installation of the hanger member on the brace.

Another aspect of the invention is to provide a brace assembly having a brace and a hanger member that is slidable along the length of the brace. The brace has a mounting bracket at each longitudinal end for coupling to a support, such as a ceiling grid or ceiling bar support. The brace has a longitudinal slot in a bottom side formed by inwardly turned edges and side walls forming a longitudinal channel. A bar having a plurality of screw holes is provided in the channel for coupling the hanger member to the brace and for supporting the electrical box.

One feature of the invention is to provide a brace assembly having a hanger member for coupling an electrical box to the brace. The hanger has a bottom side with at least one hole for receiving a mounting screw or other fastener that extends through the rear wall of an electrical box and into the brace. The screws extend through holes in the electrical box and the hanger member and into a threaded hole in a bar within the brace so that the hanger member and the associated electrical box can slide along the length of the brace to a selected position. The hanger member encloses the brace and is provided with an upper end that can be coupled to a secondary support such as a ceiling to support the middle portion of the brace and the weight of the electrical box.

Another feature of the invention is to provide a brace made from a single sheet of steel that is folded to form a substantially inverted T-shape. The brace has a pair of parallel side walls forming a longitudinal cavity. Outwardly extending legs have a hollow interior that forms a longitudinal channel between the legs to receive a mounting bar and mounting screws from the electrical box to couple the electrical box to the brace. A slot is formed in the bottom side that enables the electrical box, mounting screws and mounting bar to slide along the length of the brace. The shape of the brace provides a very strong and rigid structure that can be made efficiently from a sheet metal blank.

The aspects of the invention are basically attained by providing a brace and electrical box assembly comprising a brace member having a top surface, an internal longitudinal channel, and a bottom side with an opening communicating with the channel. A bar is received in the channel and has a threaded hole aligned with the opening in the brace member. A hanger member is coupled to the brace and has a bottom side adapted for coupling to and supporting an electrical box. A top end with a coupling member is adapted for coupling to a support for supporting the hanger member and brace member. The electrical box has an aperture receiving a mounting screw passing through the opening in the brace member and threaded into the bar to couple the electrical box to the brace and electrical box assembly.

The various features of the invention are also attained by providing a brace assembly for supporting an electrical device, comprising a brace member having a top surface, a longitudinal internal channel, and a bottom defining a longitudinal slot open to the channel. The brace is adapted for coupling to a first support. A bar is received in the channel. The bar has a threaded hole aligned with the longitudinal slot. A hanger member with a bottom wall overlies the longitudinal slot and has an aperture aligned with the threaded hole in the bar. Side walls have a bottom end coupled to the bottom wall and a top end with a coupling member adapted for coupling the hanger member to a second support. The aperture in the bottom wall is adapted for receiving a coupling screw passing through an aperture in an electrical box and threaded into the threaded hole to couple the brace assembly and clamping the position of the electrical box to the brace assembly.

The objects and advantages of the invention are further attained by providing a brace assembly for supporting an electrical box, comprising a brace member having a top surface, an open bottom defining a longitudinal slot, and a longitudinal internal channel. A bar is received in the internal channel and has a threaded hole. A hanger member with a substantially U-shape with a bottom wall overlies the longitudinal slot in the brace member. Side walls extend upwardly adjacent the brace member. The hanger member has an aperture aligned with the threaded hole in the bar for receiving a screw passing through a hole in an electrical box and threaded into the bar to couple the electrical box to the brace assembly and clamping the position of the electrical box to the brace assembly.

Other aspects, objects and advantages of the invention will become apparent from the following detailed description of the invention, which in conjunction with the annexed drawings discloses various embodiments of the invention.

BRIEF DESCRIPTION OF THE DRAWINGS

The following is a brief description of the drawings in which:

FIG. 13 is a perspective view of the end bracket;

FIG. 14 is an end view of the end bracket of FIG. 11;

FIG. 15 is a perspective view of the hanger member;

FIG. 16 is an end view of the hanger member of FIG. 15;

FIG. 17 is a top view of the hanger member of FIG. 15;

DETAILED DESCRIPTION OF THE INVENTION

Figure 1:
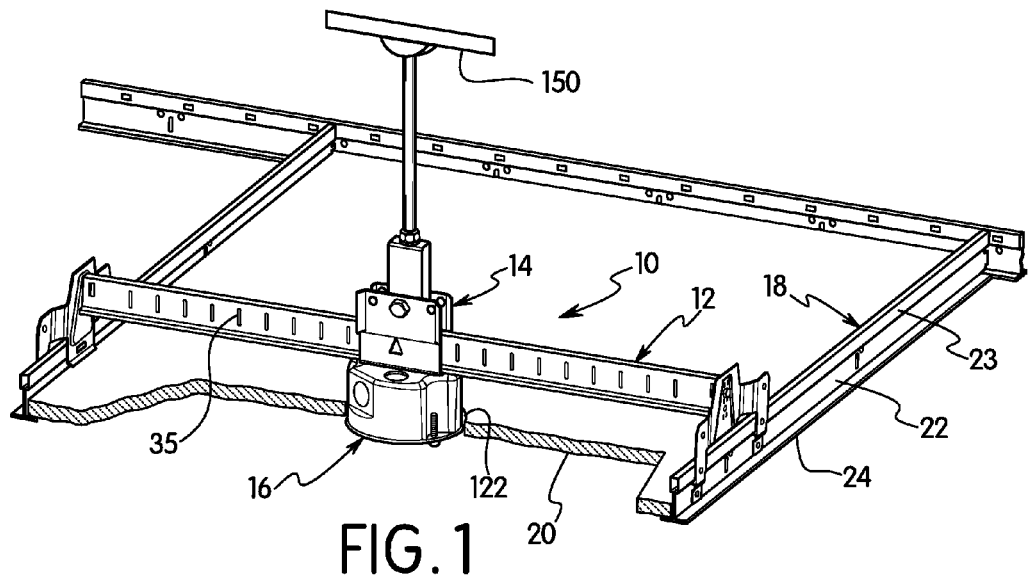
FIG. 1 is a perspective view of the brace assembly in one embodiment of the invention.

The present invention is directed to a brace assembly adapted for coupling to an overhead support and for supporting an electrical box. The invention is particularly directed to a brace assembly for mounting to a ceiling bar support and to a secondary support member to support the electrical box.

Referring to the drawings, the brace assembly 10 of the present invention includes a brace 12, a hanger member 14, and an electrical box 16. The brace assembly 10 is adapted for mounting the electrical box 16 and supporting the weight of an electrical fixture, such as a ceiling fan, luminaire or other electrical device. The brace 10 assembly is particularly directed to an assembly that can be coupled and mounted to a ceiling bar support 18 commonly used for suspended ceiling tiles 20. The ceiling bar support 18 is attached to the walls and/or ceiling above the living area of the building as known in the art.

Figure 3:
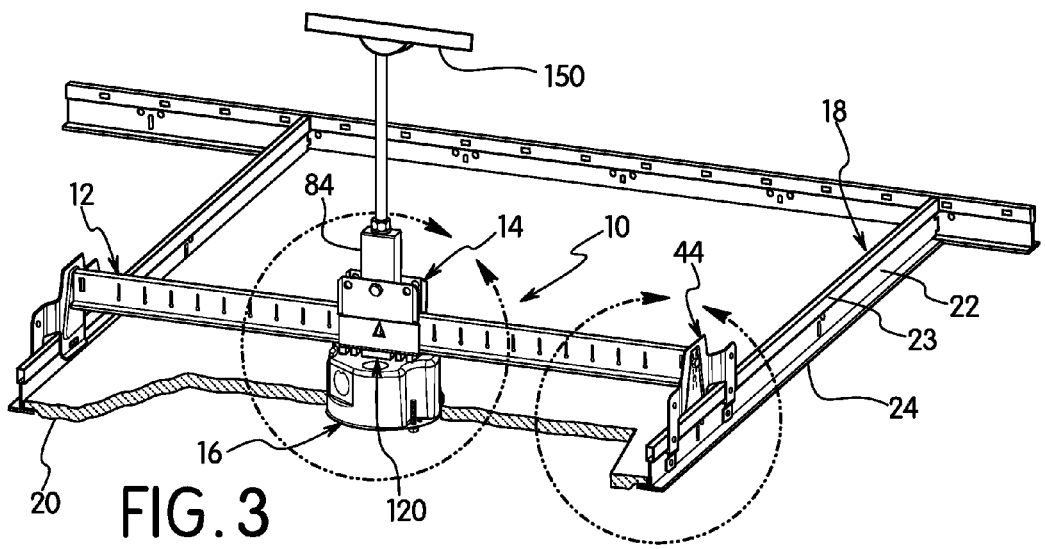
FIG. 3 is a perspective view of the brace assembly showing the ceiling with a raised panel and the spacer between the electrical box and the brace.

The ceiling bar support 18, as known in the art, generally has a substantially inverted T-shape with a vertical section 22 and outwardly extending legs 24 at a bottom end for supporting the ceiling tiles 20 as shown in FIGS. 1 and 3. The vertical section 22 of the ceiling bar 18 has a head portion 23 with a width greater than the body of the vertical section 22 providing strength and support for the ceiling panels 20 and the brace assembly 10 as shown in FIGS. 1 and 3.

Figure 11:
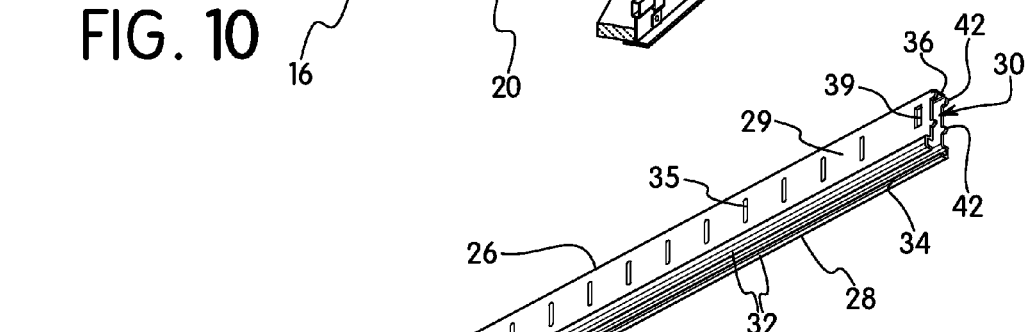
FIG. 11 is a perspective view of the body of the brace assembly.
Figure 12:
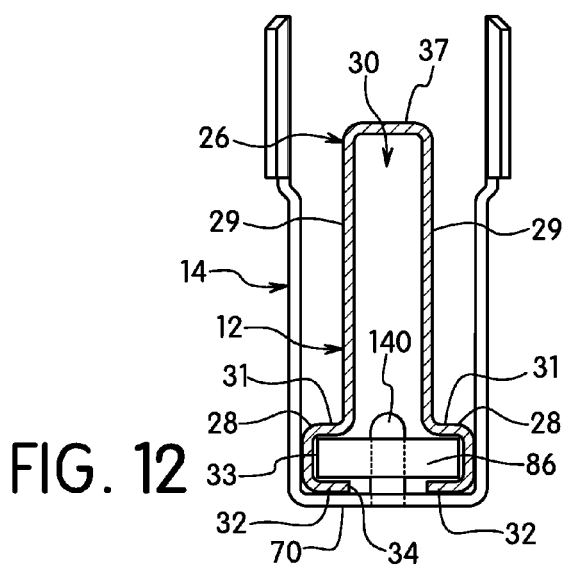
FIG. 12 is a cross sectional view of the body of the brace.
Figure 18:
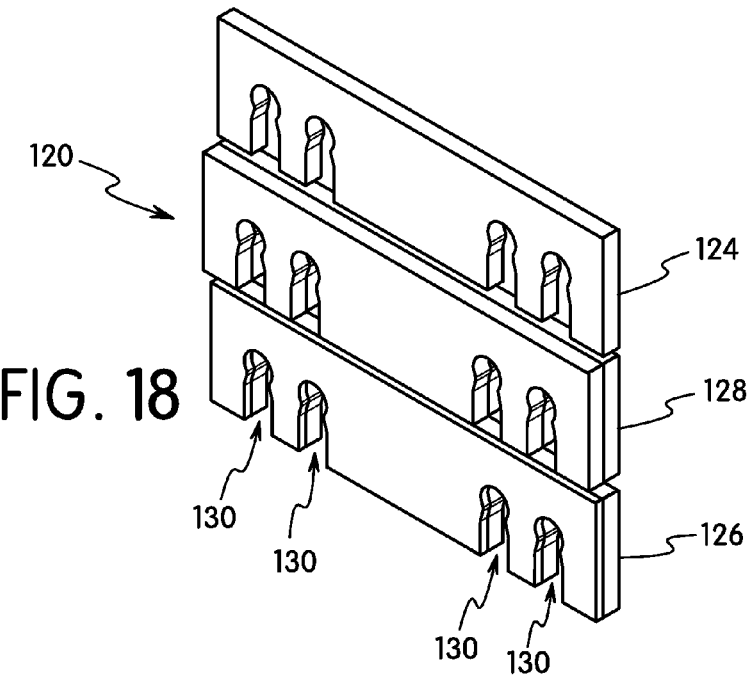
FIG. 18 is a perspective view of the spacer assembly in one embodiment of the invention.
Figure 19:
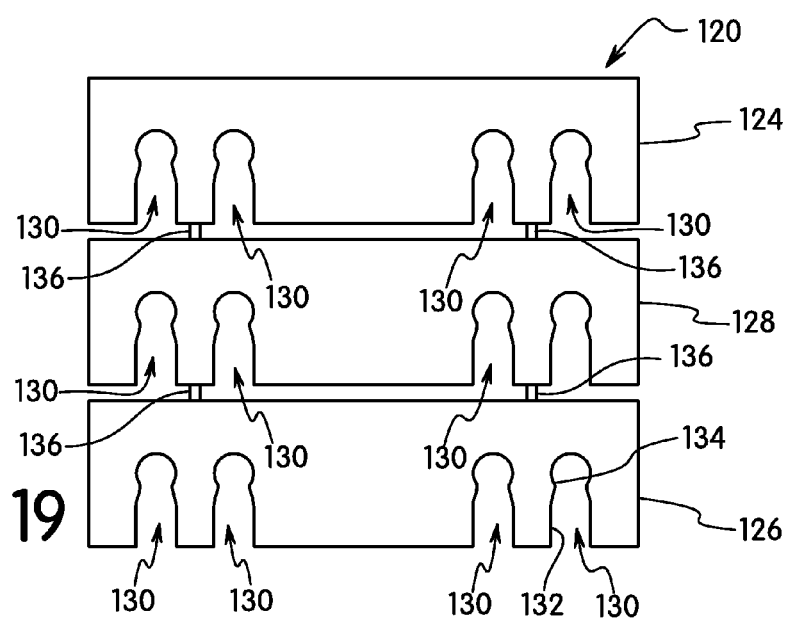
FIG. 19 is a front elevational view of the spacer assembly of FIG. 18.
Figure 20:
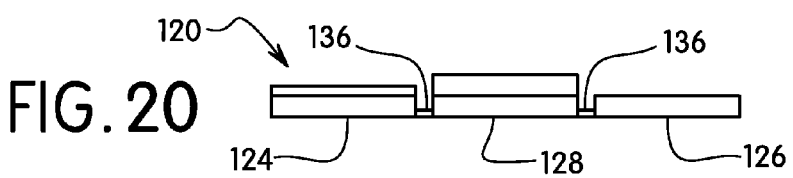
FIG. 20 is an end view of the spacer assembly of FIG. 13.

The brace 12 in the embodiment shown in FIGS. 11 and 12 has an inverted T-shape with a main body portion 26 with a top end and two outwardly extending legs 28 at a bottom end. As shown in FIG. 12, the side wall portions 29 of the main body portion 26 have a height to provide the strength sufficient to support the weight of the electrical box 16 and the electrical fixture. The sidewall portions 29 are spaced apart by a top wall 37 a distance to form a longitudinal cavity 30. The legs 28 have a top portion 31 and a bottom return portion 32 to form a longitudinal channel 33 between the top portions 31 and the bottom return portions 32 and to define a substantially T-shape. The inner edges of the bottom return portions 32 are spaced apart a distance to form an opening forming a longitudinal slot 34 in the bottom side of the brace 12 that extends the length of the brace 12. In the embodiment shown, the brace 12 is made from a single sheet of cut steel that is bent and folded into the end shape as shown. The inverted T-shaped provides a very rigid and strong structure that can be made efficiently from a steel blank by folding to the shape shown in the figures. The brace 12 includes a plurality of markings or indicia 35 on the side wall portion 29 for spacing and positioning the hanger 14 and the electrical box 16 in the desired location along the length of the brace. The indicia 35 are generally markings of the distance from the ends to assist in the location of the electrical box on the brace 12. The indicia are typically provided in 1 inch and ½ inch increments. The brace can also have markings or indicia identifying a load rating for the brace and the electrical box after installation.

The longitudinal ends 36 of the main body portion 26 of brace 12 have an aperture 38 extending through both side walls 29 of the main body 26. A fastener 40, typically in the form of a nut, is received in each aperture 38. The nut 40 has a threaded hole extending through that is aligned with the longitudinal cavity 30 of the main body portion 26. The faces of the longitudinal ends 36 of the main body portion 26 of the brace 12 have a plurality of prongs 42 for projecting outwardly along the axis of the brace 12. An end bracket 44 is coupled to each longitudinal end of the main body 26 of the brace 12 for mounting the brace assembly 12 to a support surface such as the ceiling support 18. The end brackets 44 have a screw hole 46 for receiving a coupling screw 48 that extends through the end bracket 44 and into the longitudinal cavity 30 where the screw 48 is screwed into the nut 40 to secure the end bracket 44 to the main body 26 of the brace 12. The end brackets 44 include a plurality of apertures to receive the prongs 42 for stabilizing the end bracket 44 on the end of the body 26 of the brace 12.

Figure 2:
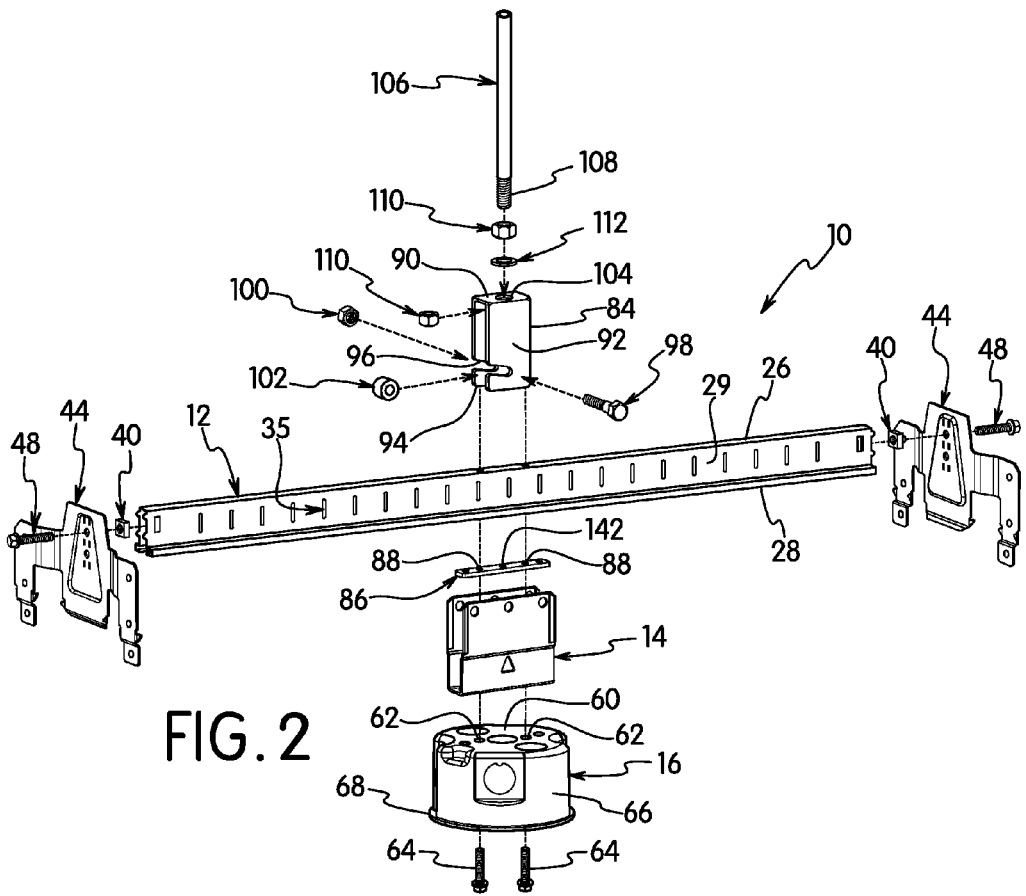
FIG. 2 is an exploded view of the brace assembly of FIG. 1.

The end brackets 44 as shown in FIGS. 13 and 14 have a main body portion 50 with a substantially planar configuration. A first and a second leg 52 extend from the longitudinal ends of the main body portion 50. As shown in FIGS. 13 and 14, the legs 52 are off-set from the main body portion 50 a distance corresponding substantially to the width of the ceiling support bar 18. The legs 52 include a bent portion 54 extending from the main body 50 forming a support surface for engaging the top surface of the ceiling support bar 18. As shown in FIG. 2 and FIG. 13, an outwardly extending flange on the legs 52 include upwardly extending prongs 56 for gripping the bottom edge of the enlarged top edge 23 of the vertical section 22 of the ceiling support 18. The bottom end 58 of each leg 52 is offset inwardly toward the main body 50 as shown for coupling to the ceiling support 18 as shown.

The electrical box 16 as shown in FIG. 1 can be a conventional electrical box capable of supporting the weight of the intended electrical fixture. The electrical box 16 in the embodiment shown has a rear wall 60 with a plurality of screw holes 62 for receiving mounting screws 64. The electrical box 16 includes a side wall 66 with an open end for receiving the electrical wiring device. In the embodiment shown, a flange 68 at the open end includes threaded holes for receiving coupling screws for attaching the electrical fixture to the electrical box 16. The rear wall 60 can have an opening forming a sight window for viewing a load rating on the hanger 14 or the brace 12 after the electrical box is installed.

Figure 6:
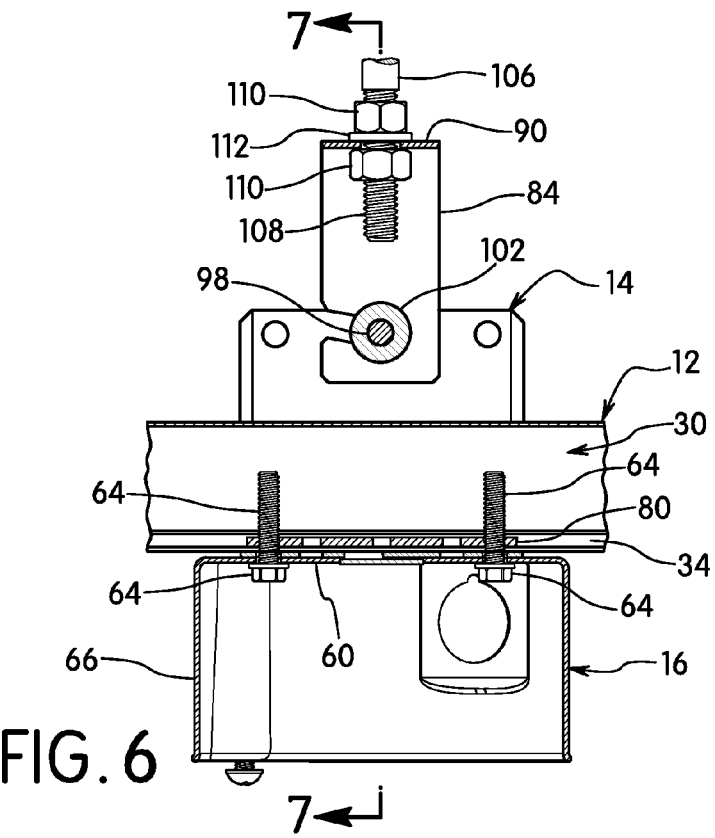
FIG. 6 is a cross section side view of the assembly of FIG. 1.
Figure 7:
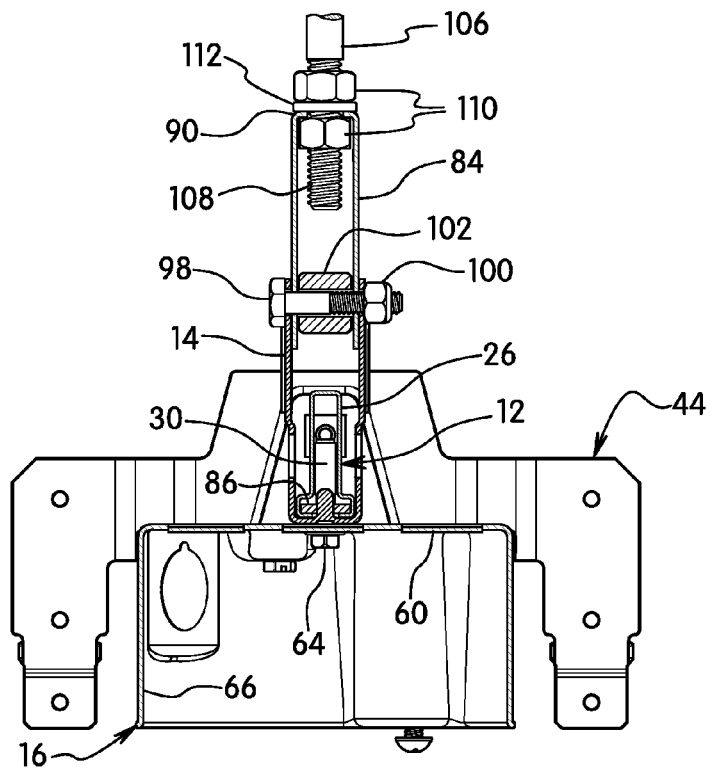
FIG. 7 is a cross sectional end view of the assembly taken along line 7-7 of FIG. 6.

The hanger 14 in the embodiment shown in FIGS. 15-17, has a substantially U-shape with a bottom wall 70 and side walls 72 extending upwardly from the bottom wall 70. Side walls 72 are substantially parallel to each other with a bottom end integrally formed with the bottom wall 70 and having a free top end 74. Referring to FIG. 7, the bottom wall 70 of hanger 14 has a width corresponding substantially to the width of the bottom end of the T-shaped brace 12. The side walls 72 are spaced-apart a distance corresponding substantially to the width of the legs 28 of the brace 12 to prevent the separation or spreading of the legs 28 under the weight of the electrical fixture. The side walls 72 have a lower portion 76 and an upper portion 78 spaced outwardly from the lower portion 76 by an offset portion. The lower portion 76 has an opening 80 defining a window for aligning with the indicia 35 on the vertical section 22 of the brace 12 to position the hanger 14 in the selected location. The top end 74 of each side wall 72 includes a plurality of holes 82 defining a coupling for coupling with a support such as a chain 116 shown in FIG. 10. A centrally positioned hole 83 is formed in each side wall 72 for coupling a mounting bracket 84 as shown in FIG. 6. The bottom wall 70 has a plurality of screw holes 71 aligned with the screw holes 62 in the electrical box.

In the embodiment shown, the opening 80 has substantially triangular shape where the apex of the triangle can be aligned with markings 35 on the brace 26 to position the hanger 14 in a selected position. The openings 80 allow inspection of the indicia or markings 35 after installation of the hanger 14 and mounting of the electrical box. In one embodiment, the brace can have marking indicating a load rating for the brace. The load rating markings are preferably visible for inspection and verification after installation of the hanger 13 and the electrical box 16. The load rating marking can be visible through the opening or window in an opening in the hanger 14 or in the rear wall 60 of the electrical box 16.

A bar 86 is provided for coupling the electrical box 16 to the hanger member 14. The bar 86 as shown in FIG. 2 is a substantially flat plate having a length and width corresponding substantially to the width of the longitudinal channel 33 formed by the legs 28 of the brace 12. The bar 86 includes a plurality of threaded holes 88 for receiving the mounting screws 64 extending through the rear wall 60 of the electrical box 16. The bar 86 has a dimension to fit within the longitudinal channel 33 and slide along the length of the brace 12 as shown in FIGS. 6 and 7. The bar 86 and the hanger 14 are able to slide along the length of the brace 12 to adjust the position of the electrical box 16 on the brace 12. In the preferred embodiment of the invention, the bar 86 is captured within the channel 33 so that upward and downward movement of the bar 86 is limited by the top portions 31 and bottom portion 32 of the legs 28. The bar 86 is retained in the bottom portion of the brace with the face of the bar 86 and the screw holes 88 aligned with the slot 34.

Referring to FIGS. 15-17, the bottom wall 70 of hanger 14 includes a plurality of holes 71 having a dimension to receive the mounting screws 64 and to allow the mounting screws 64 to pass through for screwing into the bar 86. In the embodiment shown, four screw holes 71 are provided that complement the screw holes 62 in the rear wall 60 of the electrical box 16 and the threaded holes 88 in the bar 86. The screw holes 71 and 62 can be arranged to accommodate different orientations of the electrical box with respect to the brace 12. In one embodiment shown in FIGS. 1 and 2, two mounting screws 64 are provided for coupling the electrical box 16 to the brace assembly 12. Alternatively, more than two mounting screws can be used depending on the electrical box and the number or arrangement of the screws in the rear wall of the electrical box.

The bottom wall 70 of the hanger 14 also includes a tab 140 that is cut from the bottom wall 70 and bent upwardly to extend perpendicular to the plane of the bottom wall 70. The tab 140 extends through a centrally located hole 142 in the bar 86 to position the bar 86 and the respective holes aligned with the holes 71 in bottom wall 70 of the hanger 14.

The side walls 72 of the hanger 14 have a height to extend above the top end of the brace 12 as shown in FIGS. 6 and 7. In the embodiment of FIGS. 6 and 7, the mounting screws 64 extend through the screw holes 62 in the rear wall 60 of the electrical box 16 and extend through a corresponding screw hole 71 in the bottom wall 70 of the hanger 14 and into the threaded holes 88 of the bar 86. The bar 86 and the electrical box 16 slide along the length of the brace 12 to the desired position. The mounting screws 64 are tightened to clamp the bar 86 against the bottom flanges 32 of the brace 12 to secure the electrical box 16 to the brace 12 in a fixed position on the brace assembly 12. As shown in FIG. 7, the mounting screws 64 are screwed upwardly through the bottom side of the brace 12 and through the bar 86 to extend into the channel 30.

The bottom wall 70 of the hanger 14 has a width corresponding substantially to the width of the bottom end of the brace 12 as shown in FIG. 7. The side wall 72 of the hanger 14 capture the side edges of the bottom end of the brace 12 to prevent the bottom end and the slot 34 from spreading apart and opening due to the weight of the electrical box 16 and the electrical fixture.

The mounting bracket 84 is removably coupled to the hanger 14 for connecting the hanger bracket 84 to a secondary support for providing additional support for the electrical box 16. The mounting bracket 84 in the embodiment shown in FIG. 2 has a substantially inverted U-shape with a top wall 90 and side walls 92 with an open bottom end 94. The side walls 92 are spaced apart a distance to fit within the side walls 72 of the hanger 14 as shown in FIG. 7. Each side wall 92 has a hook-shaped slot 96 to receive a bolt 98 or other fastener. As shown in FIGS. 6 and 7, the bolt 98 passes through a central hole 83 at the upper end of the side walls 72 of the hanger 14 and is coupled to the mounting bracket 84 by a nut 100. A sleeve 102 is provided on the bolt 98 to position and prevent inward bending of the side walls 92 of the mounting bracket when the nut is tightened. The mounting bracket 84 is removably coupled to the hanger by moving the slots 96 over the bolt 98 to the position shown in FIG. 6. The sleeve 102 spaces the side walls 92 against the side walls 72 of the hanger 14 and provide a clamping surface when the nut 100 and bolt 98 are tightened to secure the mounting bracket 84 to the hanger 14.

The top wall 90 of the mounting bracket 84 includes a central aperture 104 shown in FIG. 2. A support rod 106 having a threaded end 108 receives a pair of nuts 110 and a washer 112 for coupling the rod 106 to the top wall 90 as shown in FIG. 7. The rod 106 extends upwardly to a support 150 such as a ceiling to provide additional support for the electrical box as shown in FIG. 1.

During use, the electrical box 16 is attached to the brace 12 by the mounting screws 64. The end brackets 44 are coupled to the ceiling support 18 as shown in FIG. 1. The mounting bracket 84 is coupled to the hanger 14 with the rod 106 fixed to a ceiling 150 or other support.

Figure 10:
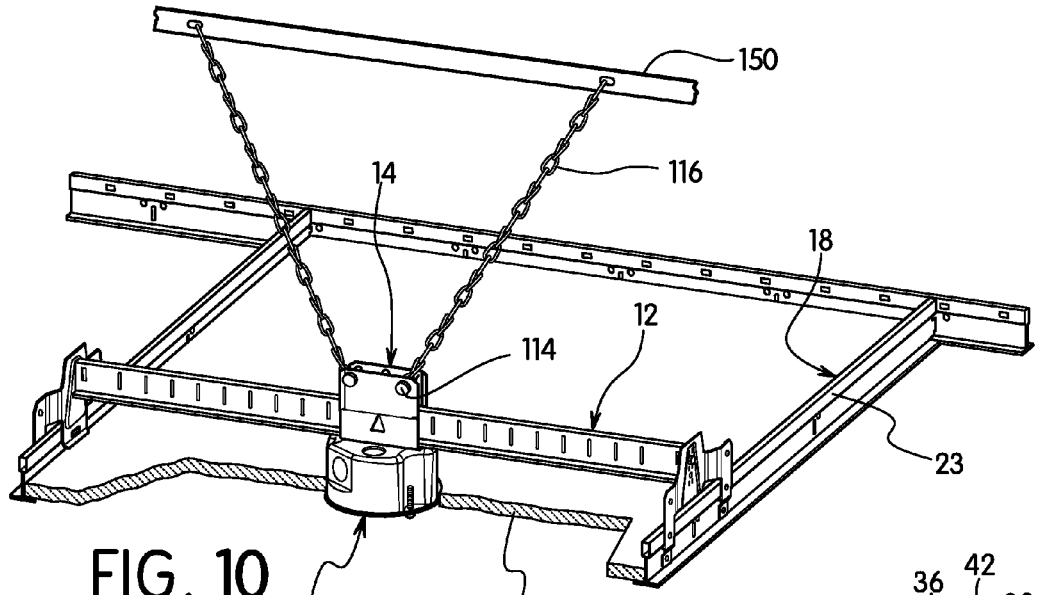
FIG. 10 is a perspective view of the assembly with a chain support.

In an alternative embodiment shown in FIG. 10, the mounting bracket 84 can be removed from the hanger 14. The outermost apertures 82 in the top end of the side walls 74 of the hanger 14 can receive a pin 114 or bolt for coupling a chain 116. The chain or other support member extends upwardly and is fixed to the ceiling or support 150 to support the weight of the electrical device and electrical box.

The brace assembly 12 is adapted for supporting the electrical box in various positions and for positioning the electrical box at a selected height with respect to the ceiling support 18. Typically, the brace assembly 12 positions the open end of the electrical box 16 flush with the outer face of the ceiling tile 20 as shown in FIG. 1. The assembly of the invention can accommodate different forms or thicknesses of the ceiling tile or ceiling panel. For example, FIG. 3 shows a ceiling tile 20 having an outwardly beveled face so that the outer face of the ceiling tile is spaced further from the brace assembly 12 compared to the ceiling tile of FIG. 1.

Figure 4:
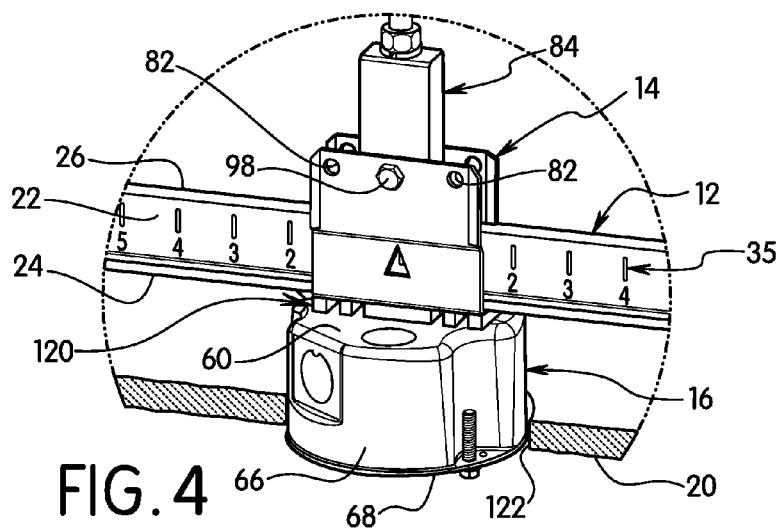
FIG. 4 is an enlarged view of the electrical box and spacer coupled to the brace.
Figure 5:
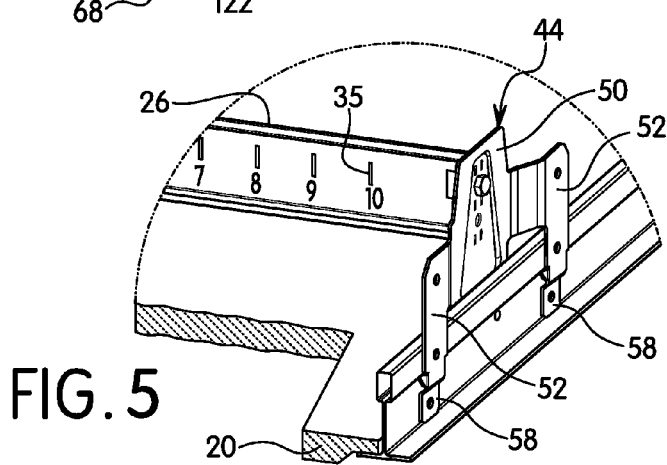
FIG. 5 is an enlarged view of the end bracket coupled to the ceiling support.

In one embodiment of the invention, one or more spacers 120 can be positioned between the rear wall 60 of the electrical box 16 and the bottom wall of the hanger 14. The spacer 120 has a predetermined thickness to position the electrical box 16 to correspond to the location of the opening in the ceiling. As shown in FIG. 4, the spacer 120 has a thickness to position the open end of the electrical box 16 within the hole 122 and the ceiling tile to be flush with the outer surface of the ceiling tile 20.

Referring to FIG. 4, the spacer 120 has a length and width corresponding substantially to the length and width of the bottom wall 70 of the hanger 14. The spacer 120 preferably has a plurality of holes or slots aligned with the mounting screws 64 so that the spacer 120 is clamped between the electrical box 16 and bottom wall 70 of the hanger 14.

In one embodiment, a plurality of spacers are provided as a kit or assembly with the brace assembly 12. The spacer assembly 122 can be an assembly shown in FIGS. 13, 14 and 15 having three spacers 124, 126 and 128, each having a different thickness to accommodate different depths or spacing of the outer face of the ceiling to the brace 12. By way of example, the spacers 124, 126 and 128 can have a thickness of about 0.125 inch, 0.188 inch and 0.250 inch, respectively. The spacers can be used alone or in combination to space the electrical box 16 a desired distance from the brace 12. Each spacer has a plurality of open slots 130 on a longitudinal side for sliding over the mounting screws 64 during assembly. The slots 130 have a first portion 132 with a width to accommodate the mounting screw 64 and an inwardly extending projection 134 forming a generally key-hole shaped slot for retaining the spacer on the mounting screws 64 by an interference fit. The spacers are typically made of a plastic material to enable the spacers to snap onto the screws 64 by sliding between the bottom wall 70 of the hanger 14 and the rear wall 60 of the electrical box 16.

In the embodiment shown, each spacer has four slots 130 to align with the respective openings in the rear wall 60 of the electrical box 16 and the threaded holes 88 in the bar 86. In one embodiment of the invention, the spacers are provided as a single unit coupled by frangible tabs 136 between the spacers as shown in FIGS. 14 and 15. During use, the spacers are separated from each other by bending and breaking the tabs 136. The spacers can be used individually or stacked together to provide the desired thickness for positioning the electrical box with respect to the ceiling.

Figure 8:
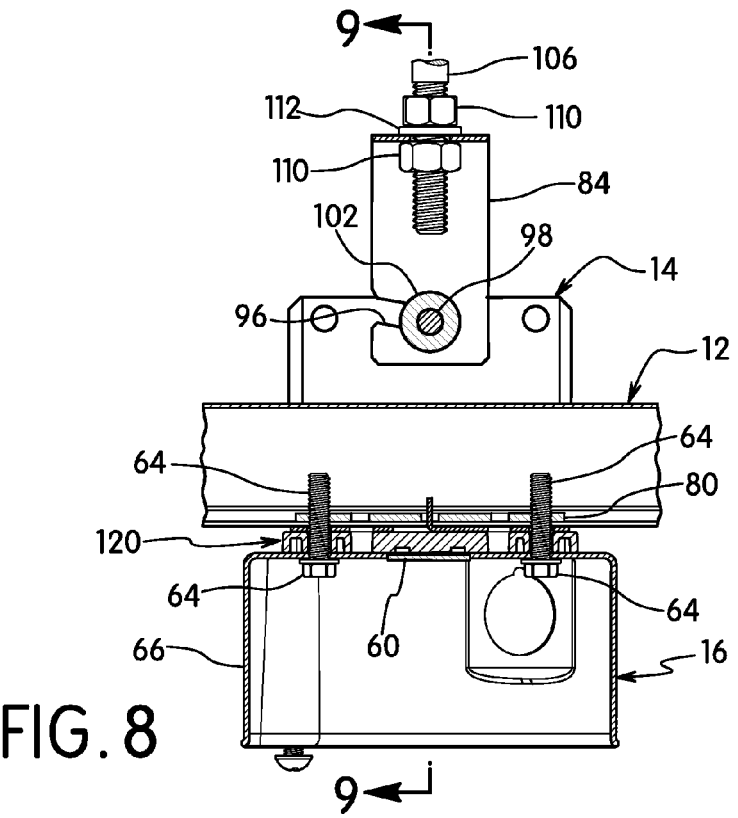
FIG. 8 is a cross sectional side view of the assembly of FIG. 1.
Figure 9:
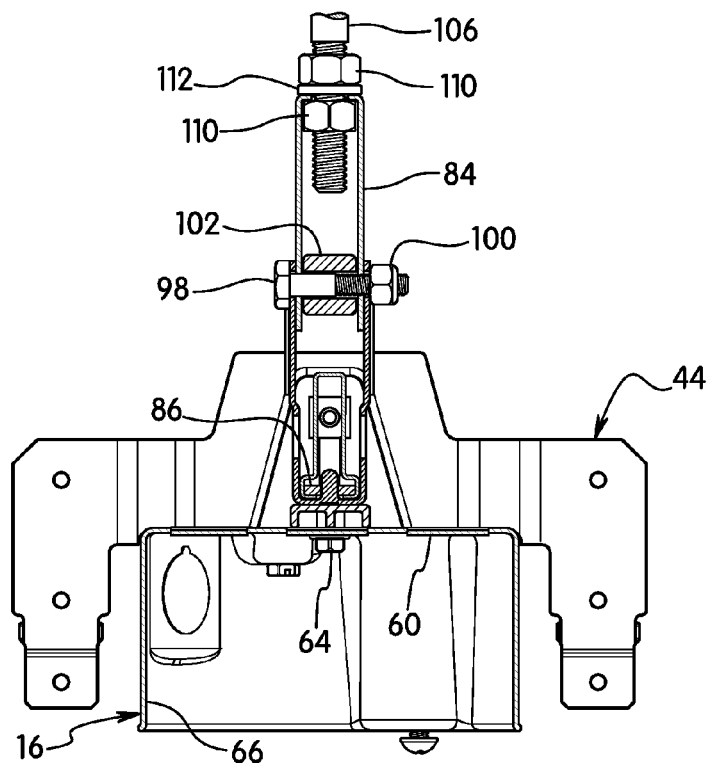
FIG. 9 is a cross sectional end view of the assembly taken along line 9-9 of FIG. 8.

During use and assembly, the brace 12 is coupled to the ceiling support 18 as shown in FIGS. 1 and 3. The hanger 14 slides upwardly from the bottom side of the body 26 of the brace 12 with the holes 71 in the bottom wall 70 of the hanger aligned with the holes in the bar 86. The mounting screws 64 are passed through the rear wall 60 of the electrical box 16 as shown in FIG. 6, and threaded into the bar 86. The electrical box 16 and the hanger 14 are able to slide along the longitudinal length of the main body 26 of the brace 12 to the desired position. The mounting screws 64 can then be tightened to clamp the electrical box 16 to the bar 86 and the brace 12. One or more spacers 120 or one or more spacers of the spacer assembly 122 can be positioned between the rear wall 60 of the electrical box 16 and the bottom wall 70 of the hanger to space the electrical box from the hanger. In the embodiment shown, the spacers slide over the mounting screws 64 by sliding between the bottom wall 70 of the hanger and the rear wall 60 of the electrical box 16. The screws are than tightened to clamp the electrical box to the brace as shown in FIGS. 8 and 9.

In one embodiment shown in FIG. 10, chains 116 or other support members can be coupled to the top end of the hanger 14 and fixed to the ceiling 150 or other vertical support to provide additional support for the electrical box 16 and to support the weight of the electrical device coupled to the electrical box. In an alternative embodiment, the mounting bracket 84 can be hooked onto the bolt 98 extending through the center hole of the side walls 72 of the hanger 14. The rod 106 or other support member can be coupled to the top end of the hanger 14 and coupled to the ceiling or other overhead support as shown in FIG. 1.

While various embodiments are shown to illustrate the invention, it will be understood by those skilled in the art that various changes and modifications can be made without departing from the scope of the invention as defined in the appended claims.

What is claimed is:

1. A brace and electrical box assembly comprising:
   a brace having a top end, an internal longitudinal channel, and a bottom end with a bottom portion defining a longitudinal slot communicating with said longitudinal channel;
   a bar received in said channel and having a threaded hole aligned with said slot in said brace;
   a hanger coupled to said brace and having a bottom wall with a screw hole and being adapted for coupling to and supporting an electrical box, and a top end having a coupling adapted for coupling to a support for supporting said hanger and brace; and
   the electrical box having an aperture receiving a mounting screw passing through said screw hole in said hanger and said slot in said brace and threaded into said threaded hole in said bar to couple the electrical box to the brace and said hanger.

2. The assembly of claim 1, wherein
   said hanger is substantially U-shaped with said bottom wall juxtaposed to said bottom end of said brace, and having side walls extending upwardly from said bottom wall, said side walls having a height greater than a height of said brace whereby said top end of said hanger extends above said top end of said brace, and where said coupling at said top end of said hanger is a hole extending through said side walls.

3. The assembly of claim 2, wherein
   said bottom wall of said hanger has an upwardly extending tab extending through said slot and is received in a hole in said bar to align said screw hole of said hanger with said threaded hole in said bar.

4. The assembly of claim 2, wherein said hanger further comprises
   a mounting bracket removably coupled to said hanger, said mounting bracket adapted for coupling to a support for supporting said assembly.

5. The assembly of claim 4, wherein
   said hanger includes a bolt extending between said side walls, and said mounting bracket has an opening for receiving said bolt to couple said mounting bracket to said hanger.

6. The assembly of claim 1, further comprising
   at least one spacer positioned between said bottom wall of said hanger and the electrical box, said at least one spacer having a width corresponding substantially to a width of said bottom end of said brace and having an open slot to receive the mounting screw from said electrical box.

7. The assembly of claim 1, wherein
   said brace has a longitudinal end, an opening at said longitudinal end, a nut received in said opening, an end bracket for coupling to a ceiling bar support, and a screw extending through said end bracket into said nut for coupling said end bracket to said brace.

8. The assembly of claim 7, wherein
   said end bracket has a first leg extending from a first end of said end bracket, and a second leg extending from a second end of said end bracket, said first leg and second leg being spaced from said end bracket to capture the ceiling bar support therebetween.

9. A brace assembly for supporting an electrical device, comprising:
   a brace having a top end, and a bottom end with outwardly extending legs forming a longitudinal internal channel and a longitudinal slot open to said channel, said brace being configured for coupling to a first support;
   a bar received in said channel, said bar having a threaded hole aligned with said longitudinal slot;
   a hanger having a bottom wall overlying said longitudinal slot and having a screw hole aligned with said threaded hole in said bar, side walls having a bottom end coupled to said bottom wall and a top end with a coupling configured for coupling said hanger to a second support, said screw hole in said bottom wall adapted for receiving a mounting screw passing through a screw hole in an electrical box and threaded into said threaded hole in said bar to couple the electrical box and hanger to the brace and to clamp the position of the electrical box with respect to the brace.

10. The brace assembly of claim 9, wherein
    said top end of said hanger has at least one first hole defining said coupling for coupling said hanger to said second support.

11. The brace assembly of claim 10, wherein
    said top end of said hanger has a second hole for removably receiving a bolt.

12. The brace assembly of claim 11, further comprising
    a mounting bracket removably coupled to said bolt at said top end of said hanger.

13. The brace assembly of claim 12, wherein
    said mounting bracket includes a slot for removably receiving said bolt.

14. The brace assembly of claim 13, wherein
    said bolt extends through said hanger and includes a sleeve between said side walls of said hanger.

15. The brace assembly of claim 9, further comprising
    at least one removable spacer positioned between said bottom wall of said hanger and the electrical box, said at least one spacer having a slot defining an opening for receiving said mounting screw from said electrical box to capture said spacer and space said electrical box from said hanger a predetermined distance.

16. The brace assembly of claim 9, wherein said brace further comprises
    a longitudinal end with an aperture therein, a nut with a threaded hole received in said aperture and positioned in said longitudinal channel; and
    an end bracket for coupling to a ceiling bar support, a screw extending through said end bracket and said longitudinal channel for coupling to said nut.

17. The brace assembly of claim 16, wherein
    said end bracket has a first leg extending from a first end of said end bracket and a second leg extending from a second end of said end bracket, said first and second legs being spaced from said end bracket to capture the ceiling bar support therebetween.

18. A brace assembly for supporting an electrical box, comprising:
    a brace having a top end, an open bottom end having a longitudinal slot, and a longitudinal internal channel;

a bar received in said internal channel and having a threaded hole;

a hanger having a substantially U-shape with a bottom wall overlying said longitudinal slot in said brace, and side walls extending upwardly adjacent said brace, said hanger having a hole in said bottom wall aligned with said threaded hole in said bar;

an electrical box having a rear wall with a screw hole, and a screw passing through said hole in said rear wall and said hole in said bottom wall of said hanger and threaded into said bar to couple the electrical box and hanger to said brace and clamping the position of the electrical box with respect to the brace.

19. The brace assembly of claim 18, wherein said brace has an end bracket at each longitudinal end for coupling to a first support; and said hanger having a mounting bracket removably coupled to a top end of said hanger for coupling to a second support.

20. The brace assembly of claim 19, wherein said side walls of said hanger extend above said top end of said brace and include a fastener extending between said side walls.

21. The brace assembly of claim 20, wherein said hanger further comprises a mounting bracket removably coupled to said fastener of said hanger and said fastener having a sleeve in said mounting bracket for receiving said fastener.

22. The brace assembly of claim 20, further comprising a removable spacer positioned between said bottom wall of said hanger and said electrical box to space said electrical box from said brace a predetermined distance.

23. The brace assembly of claim 22, wherein said spacer has a transverse slot for receiving said mounting screw from said electrical box.

24. The brace assembly of claim 19, wherein each respective end bracket has a first leg extending from a first end and a second leg extending from a second end, said first and second legs being spaced from said end bracket a distance to couple to said first support, and where said first support is a ceiling bar support.

25. The brace assembly of claim 19, wherein said longitudinal ends of said brace have an aperture receiving a nut with a threaded hole positioned in the longitudinal channel, and said respective end bracket has a screw hole receiving a coupling screw for coupling to said nut for coupling said end bracket to said brace.

26. The brace assembly of claim 18, wherein said brace comprises a body portion having a top end and a bottom end and a longitudinal cavity;

a pair of legs extending outwardly from said bottom end of said body portion and forming said longitudinal channel, said longitudinal channel having a dimension to receive said bar to enable sliding movement of the bar within said longitudinal channel, each of said legs having a bottom portion being spaced apart a distance to form said longitudinal slot.

27. The brace assembly of claim 18, further comprising a spacer assembly having a plurality of spacers coupled together by frangible portions, each of said spacers being adapted for removably coupling to said mounting screw between said hanger and said electrical box, each spacer having a predetermined thickness and having a length and width corresponding substantially to a length and width of said bottom wall of said hanger, and having a slot in a side edge for receiving said mounting screw and spacing said electrical box from said hanger a distance corresponding to at least one of said spacers.

* * * * *